March 18, 1952   A. R. LINDSAY   2,590,025
SELF-SUPPORTING AUTOMOBILE STRUCTURE AND WHEEL
SUPPORTING BEAM SECURED BY VERTICAL BOLTS
Filed June 8, 1950

INVENTOR.
Alexander R. Lindsay
BY Maurice A. Crews
ATTORNEY

Patented Mar. 18, 1952

2,590,025

UNITED STATES PATENT OFFICE 2,590,025

SELF-SUPPORTING AUTOMOBILE STRUCTURE AND WHEEL SUPPORTING BEAM SECURED BY VERTICAL BOLTS

Alexander R. Lindsay, Detroit, Mich., assignor to The Budd Company, Philadelphia, Pa., a corporation of Pennsylvania Application June 8, 1950, Serial No. 166,890

2 Claims. (Cl. 296—28)

The invention relates to improvements in a combined body and chassis or a self-supporting body structure for automobiles in which a transverse axle beam forming part of the running gear is held by vertical bolts extending through side sills and in which side wall extensions or wheel housings are secured to the outsides of the side sills.

The main object of the invention is the overcoming of certain difficulties in regard to the arrangement and installation of the bolts holding the axle beam, such difficulties consisting mainly in the inaccessibility of the bolts and of the nuts for securing them.

The object of the invention is achieved by providing in the side wall extensions inwardly projecting, outwardly open pockets so that the bolts or the nuts screwed on them become accessible from the outside.

The invention achieves a further advantage by using the pockets as corner reinforcements or brackets between the side sills, the wall extensions and/or inclined braces extending from about the axle beam attachment zone upwardly toward the mid-region of the automobile.

An embodiment of the invention is illustrated in the attached drawing and described in the following.

Figure 1:
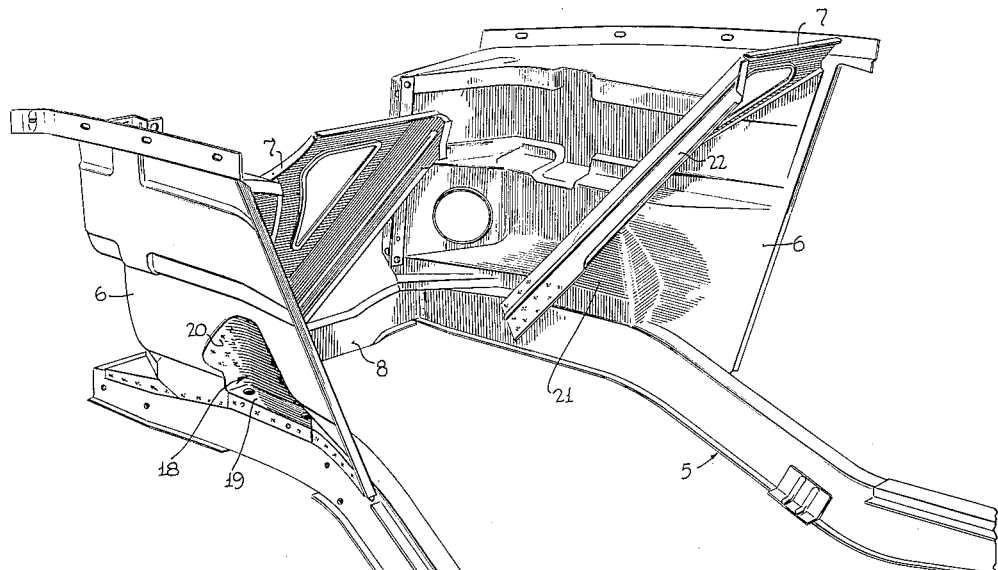
Figure 1 is a three-quarter rear perspective of the front end structure of a self-supporting or frameless automobile body.
Figure 2:
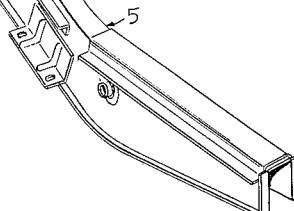
Figure 2 is a fragmentary side elevation and a fragmentary section through the axle beam and its connecting means.
Figure 3:
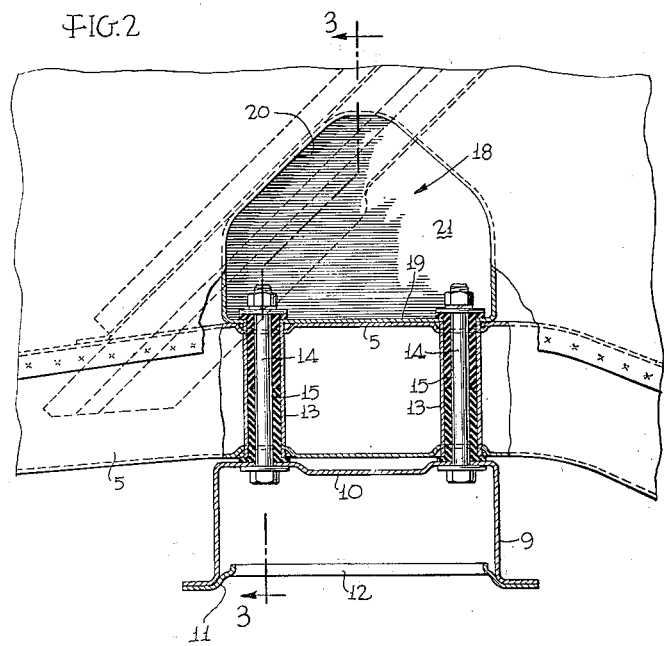
Figure 3 is a fragmentary transverse section along line 3—3 of Figure 2.
Figure 3:
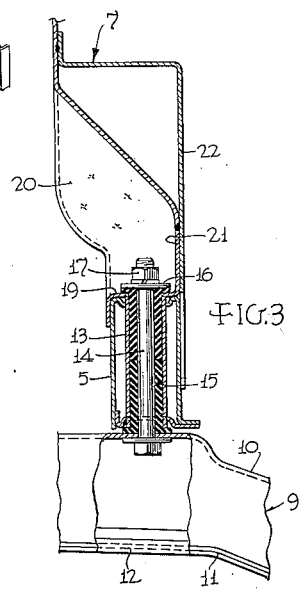

The structure illustrated in the drawing comprises a pair of side sill members 5, side wall extensions or wheel housings 6, inclined braces 7, and a transverse brace 8. The structure and its connection with the end of a body proper (not shown) are known and may be of the general design disclosed, for instance, in Patent No. 2,380,031 of Deisley, Ulrich, and Lindsay, issued July 10, 1945, for "Vehicle Structure, Especially Vehicle Front End Structure."

A hollow section beam 9 has its outer (not shown) ends adapted for connection with wheel guiding and springing means of known type. The beam is formed of a downwardly facing channel section having a top web 10, and of a bottom wall 11. Bottom wall 11 is provided with openings 12 where beam 9 passes beneath the respective sill 5.

At the intersection with beam 9, hollow-section sills 5 have their top and bottom walls braced against each other by pairs of vertical sleeves 13. These sleeves pass through openings in the walls of the sills and are secured therein such as by arc welding.

Bolts 14 pass through openings in wall 10 of beam 9 and through the sleeves 13 with the interposition of vibration-absorbing, elastomer bushings 15. The widened ends of the bushings fit between top 10 of beam 9 and bottom of sill 5 and between top of sill 5 and washers 16 held by nuts 17 screwed on the bolts 14. The bolts 14 can be inserted and their heads can be held through the openings 12 in bottom 11 of beam 9.

So as to render the upper ends of the bolts with their washers 16 and nuts 17 accessible from the outside, wheel housing walls 6 are provided with inwardly projecting, outwardly open pockets 18. Each pocket has a bottom wall 19 overlying the top of sill 5 and fitting under the ends of the rubber bushings 15. An inclined forward wall portion 20 of each pocket fits against the underside of brace 7 and is secured thereto. Inner walls 21 of the pockets are partly overlapped and secured by spot welds to the downwardly and rearwardly extending flange 22 of brace 7.

The pockets 18 not only render the upper ends of the bolts accessible for installation and tightening, but they also form brackets or gussets in the corners between the sills 5 and the braces 7, thereby strongly reinforcing the structure in the region which has to transmit the stresses from axle beam 9 into the sills 5, walls 6, and braces 7, and thence into the remainder of the body structure.

Though one embodiment only of the invention is shown, it will be understood that modifications and adaptations will easily occur to those skilled in the art.

What is claimed is:

1. In a self-supporting automobile structure having longitudinally extending side sill members connected on the outside with side wall panels, a transverse axle beam passing under said sills and vertical bolts extending through said sills and securing said beam, the provision of inwardly projecting, outwardly open pockets in the side wall panels at the locations of said bolts so as to render the upper ends of the latter accessible for installation and tightening.

2. In a self-supporting automobile body structure of the type having side sill members structurally connected with wheel housings and with braces inclined upwardly toward the middle of the body, the provision of inwardly projecting, outwardly open pockets in said wheel housings in the corners where the side sills and the braces meet, so as to render accessible the upper ends of bolts passing through the sills and serving for the connection of the latter with a transverse beam forming part of the running gear, and said pockets having their walls secured to said sills and braces, so as to reinforce the connections between said sills, wheel housings, and braces.

ALEXANDER R. LINDSAY.

REFERENCES CITED

The following references are of record in the file of this patent:

UNITED STATES PATENTS

| Number | Name | Date |
|---|---|---|
| 2,380,031 | Deisley et al. | July 10, 1945 |